United States Patent [19]

Hanson

[11] 3,890,664
[45] June 24, 1975

[54] SURFACE TREATMENTS

[75] Inventor: Raymond Hanson, Rearsby, England

[73] Assignee: USM Corporation, Boston, Mass.

[22] Filed: Nov. 21, 1973

[21] Appl. No.: 417,871

[30] Foreign Application Priority Data
Nov. 23, 1972 United Kingdom............ 54229/72
Oct. 11, 1973 United Kingdom............ 47452/73

[52] U.S. Cl............................................ 12/146 B
[51] Int. Cl........................................... A43d 00/00
[58] Field of Search..... 12/1 R, 41.3, 142 R, 146 R, 12/146 B, 146 BR

[56] References Cited
UNITED STATES PATENTS
| | | | |
|---|---|---|---|
| 1,937,807 | 12/1933 | Bodle............................ | 12/146 BR |
| 2,395,133 | 2/1946 | Mahoney et al. ............. | 12/146 B |
| 3,456,365 | 7/1969 | Sullivan........................ | 12/146 B |

*Primary Examiner*—Patrick D. Lawson
*Attorney, Agent, or Firm*—Benjamin C. Pollard; Vincent A. White; Richard B. Megley

[57] ABSTRACT

Method and apparatus for treating the surface of a synthetic elastomer workpiece to improve its ability to be coated or bonded in which the surface of the workpiece is exposed to and reacted with products generated by electrolysis at an anode in a body of aqueous electrolyte to form a surface of reacted elastomer integral with the elastomer of the workpiece. The apparatus includes an anode and a cathode mounted for immersion in a body of electrolyte, a source of electricity to create a potential difference between the anode and cathode and a workholder for supporting the workpiece with its surface adjacent the anode to receive the products of electrolysis, the workholder and anode being moveable relative to each other to control the extent of exposure of the workpiece to the products of electrolysis.

8 Claims, 1 Drawing Figure

PATENTED JUN 24 1975 3,890,664
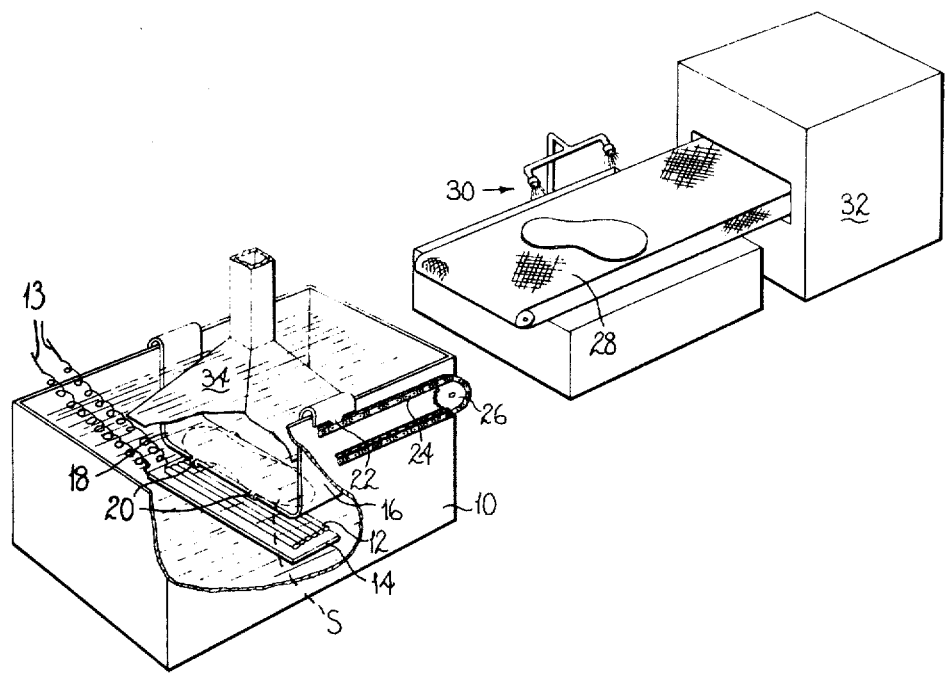

SURFACE TREATMENTS

FIELD OF THE INVENTION

This invention relates to surface pretreatment of bodies of electrically non-conductive elastomeric materials particularly shoe tread members to prepare them for bonding or coating and to apparatus useful in the surface pretreatment.

BACKGROUND OF THE INVENTION

It is known that surfaces of certain synthetic polymeric materials are difficult to wet and coat with materials intended to bond strongly to the surface. In the shoe manufacturing trade it is known that certain synthetic elastomeric soling materials for example, those known as resin-rubber soling materials (which includes sytrene-butadiene having a high styrene content, fillers and extenders) and those comprising so-called thermoplastic rubbers (for example those including styrene-butadiene-styrene block copolymers) are difficult to bond to shoe bottoms in such a way that the soles are firmly and permanently bonded to the shoe.

BRIEF SUMMARY OF THE INVENTION

It is one of the various objects of the Invention to provide a method of pretreating the surface of a synthetic elastomeric material to improve its reception of a bonding or coating composition.

It is a further object of the present invention to provide apparatus for carrying out a method according to the present invention.

BRIEF STATEMENT OF THE INVENTION

I have found that an adhesive or coating composition bonds strongly to synthetic elastomeric materials where the surface of such materials is subjected to an electrolytic treatment in an aqueous medium containing for example inorganic chloride, prior to application of the composition to the surface. I have also provided an apparatus for subjecting synthetic elastomeric materials to controlled electrolytic treatment in an aqueous medium to prepare it for coating or bonding.

DETAILED DESCRIPTION OF THE INVENTION

The present invention provides a surface pretreatment of non-conductive elastomeric material in which a surface of the material is passed adjacent to an anode in an aqueous electrolytic bath so that surface receives and is acted on by the products of electrolysis from the anode. The invention also includes an apparatus in various forms useful in carrying out the method.

Non-conductive elastomeric materials useful in the present invention includes synthetic elastomeric materials such as those used as tread members in the shoe manufacturing trade. There may be used shoe sole material which is based on resin rubber, i.e. a high styrene-butadiene rubber, or based on a thermoplastic rubber, e.g. a styrene-butadiene-styrene block copolymer which materials may contain fillers, extenders, pigments and so on. The term "tread members" includes soles, half-soles and sole and heel units which may be cut from sheets of material or formed by moulding and includes tread members having significant longitudinal transverse curvature or irregularities of their attaching surfaces.

Aqueous electrolytes useful in the present invention include aqueous solutions of various inorganic salts including zinc chloride, nickel chloride, stannous chloride, cobalt chloride, magnesium chloride, ammonium chloride, sodium chloride, calcium chloride, barium chloride, and mixtures thereof. It is observed that other inorganic salts for example the bromides for example potassium bromide may be useable in the process but tend to be less effective than the simple chloride. Acid solutions such as sulphuric acid may also be used but are not as effective as the salt solutions. The chlorides of nickel and tin and especially zinc and mixtures of zinc chloride with sodium chloride are preferred because of convenience of by-product disposal. That is with salts such as sodium, magnesium or ammonium salts, hydrogen or other additional gaseous product which is generated must be disposed of. Additionally, for best results relatively concentrated solutions are used and it seems desirable to arrange concentration of the noted electrolytes, and other variables so that chlorine is evolved at the anode at the rate of not less than about 0.3 ml/minute per cm width of anode, although satisfactory results have been achieved with an electrolyte consisting of 100 gms of zinc chloride and 100 gms of sodium chloride in a litre of water achieving a chlorine evolution of somewhat less than 0.3 ml/minute per centimetre width of anode.

Inert electrodes, for example a stainless steel cathode and a graphite anode may be used. A treated graphite rod impregnated with a polymerizable material, such as boiled linseed oil, which is polymerized in situ, resists crumbling or breaking and appears more satisfactory than the simple graphite rods. Also, with salts, for example of zinc, nickel or tin the cathode may be of the metallic component of the salt, for example metallic zinc in electrolysis of zinc chloride. The cathode may also be made of graphite in which case metal deposited from the salt solution by electrolysis may simply form as "trees" on the cathode and fall off and be collected for re-use.

In operation of the process the workpiece whose surface is to be treated may be fed past the electrode during the electrolysis, with the surface to which the adhesive is to be subsequently applied in contact with the anode or as close thereto as possible. A significant effect may be achieved if the surface is spaced half an inch from the anode but longer exposure to the electrolytic treatment is desirable. Preferably the workpiece is fed by a mechanically driven workholder through the aqueous medium, and in those cases where the workpiece has a curved surface, for example a preformed moulded sole and heel unit with a high heel, the workholder or the electrodes are preferably moveable with respect to each other so that the surface of the workpiece is presented at a constant distance from the anode. Alternatively in those cases where the workpiece is to contact the anode, the anode may be made from flexible carbonaceous material for example a brush of carbon fibres or a flexible graphite sheet. The speed at which the workpiece is traversed past the anode is chosen in conjunction with the amount of gas available at the anode, and the spacing of the workpiece from the anode in accordance with the surface configuration of the workpiece and the required exposure of the surface to materials generated at the anode.

In the operation of the process useful results may be obtained from electrolysis with a potential difference of 5 to 10 volts direct current, and an amperage of 5 to 30 amps, and by subjecting the stationary surface to the electrolysis treatment for up to 5 seconds, or by traversing the surface past the anode at no more than 12 inches per second. Treatment in excess of 5 seconds or at less than 12 inches per second appears to lead to even higher bond strengths with many electrolytic baths, but for some bonding purposes such increased greater exposure to the electrolysis treatment may be unnecessary if only moderate bond strengths are required.

In carrying out the process a workpiece subjected to the electrolytic treatment is removed from the tank washed with water and dried. It may be then stored for several days after treatment before adhesive is applied to it. In one preferred method however, the washed and dried workpiece is immediately coated with adhesive composition, for example a polyurethane or polychloroprene based solvent type cement or a hot melt.

The operation of the process will be described in connection with the apparatus forming a part of the present invention, but it will be understood that the process may be carried out using other apparatus and further that the process and examples herein described have been selected for description merely to facilitate an understanding of the invention.

The apparatus shown in FIG. 1 comprises a tank 10 filled to a predetermined level with an aqueous solution of electrolyte. An anode 12 and a cathode 14 are mounted in the tank at a level below the intended level of the aqueous electrolyte and are attached through leads 13 to a direct current electrical power source (not shown) to create a potential between the anode and cathode. In the form shown, the cathode 14 is a metal plate which can be of a corrosion resisting material, such as stainless steel, or may be a metal, such as zinc, of which a solution of the salt is the electrolyte. The anode 12 is shown as a series of parallel carbon rods mounted close to but above the cathode 14. Suitable anode rods may be, for example one-fourth inch in diameter and may be spaced, for example from seven-sixteenths inch to about three-fourths inch between centres of the rods.

A workpiece holder or carrier 16 comprises a horizontally disposed central portion 18 provided with fingers, clips or other holding devices 20 for supporting the workpiece, such as a sole to be treated, with the surface to be treated facing the anode. Side members of the carrier are arranged to support the central portion for movement relative to the anode to carry the workpiece closely adjacent to or in contact with the anode. In the form shown, upper portions of the side members of the carrier are bent over and terminate in tongues 22 which fit into openings in a carrier chain 24 running on sprockets 26 and driven by the sprockets to move the carrier in a path with the central portion 18 at a uniform distance from the anode. The surface of the workpiece should preferably pass very close, for example one-sixteenth inch or less, to or in contact with the anode, but effective treatment has been secured with a spacing up to about three-fourths inch. Where the workpiece has a curved surface, for example a preformed sole and heel unit with a high heel, the workpiece holder and the anode may be so arranged with respect to each other that the surface of the workpiece is presented at a constant distance from the electrode.

In operation of the apparatus, a tread member such as a resin-rubber outsole S is mounted on the bottom of the carrier member and held in place by the fingers 20. Electricity is supplied to create a suitable potential for example 5 to 10 volts between the anode and the cathode, so that with the anode and cathode employed and a suitable electrolyte, an amperage of from 15 to 30 amperes is obtained. When the potential is established, electrolysis of the salt solution occurs with liberation of chlorine and other products of electrolysis from the anode. The products of electrolysis engage and react with the surface of the tread member as it is fed over the anode and cathode, to form a reacted surface integral with the main body of material of the treated member. After being carried past the anode by the carrier, the tread member is removed from the carrier, placed on a perforated conveyor belt 28, which carries it beneath a high pressure water spray device 30 to wash it, and then is conveyed through a drier 32.

Gaseous or volatile products of electrolysis generated in the electrolyte bath and escaping from the bath are collected in a hood member 34. In the electrolysis of chlorides, the gaseous products may comprise as much as 98% of chlorine; this may be vented to atmosphere or preferably collected and passed in contact with metal corresponding to the metallic component of the chloride to form further metallic chloride for use in the process. Any metal component of the chloride in the case of metals, such as zinc, nickel or tin, deposited at the cathode, may be removed from the bath and reacted with the chlorine of the gas exhausted from the electrolytic bath.

The extent of treatment of the tread member surface in a bath of given electrolyte is controlled by the time during which the surface is adjacent the anode, by the size and shape of the anode, by the distance, if any, between the anode and the surface to be treated and by the current flow between the cathode and anode. The time of exposure is controlled by the speed at which the carrier is moved past the anode and by the extent of the anode in the direction of movement of the carrier.

Tread members electrolytically treated may be coated with a sole attaching adhesive composition, e.g. a polyesterurethane or polychloroprene based solvent type cement or a hot melt adhesive immediately after washing and drying, or may be stored for several days after preparation before adhesive is applied.

The following Examples are given to aid in understanding the invention; but it is to be understood that the invention is not restricted to the particular procedures, times, reagents or other details set forth in the Examples.

Example 1

Illustrative Method

Using the apparatus shown in the drawing, the tank was filled to the working level with a freshly prepared saturated solution of sodium chloride and direct current voltage sufficient to maintain a potential difference of 8 volts at about 2 amps was connected to a graphite rod anode comprising six ¼ inch carbon rods suspended horizontally with ½ inch centre-to-centre spacing of the rods and to a stainless steel cathode suspended near but below the anode. A thermoplastic rubber moulded sole and heel unit having a flat sole attaching surface was fixed in the workholder with the attaching surface downward and traversed past the anode with the sole attaching surface spaced from the anode a distance of one-fourth inch. The sole moved in a direction widthwise of the sole past the anode at a speed of one-fifth inch per second.

available in the U.K. and identified in Table I as Lacsol, which is a solution of lactic acid in organic solvent, and Unigrip 300, which is a solution of trichlorisocyanuric acid in organic solvent.

TABLE I

| Sample No. | Electrolyte | Dwell | Speed of Traverse | Distance from electrode | Voltage | Peel bond strength |
|---|---|---|---|---|---|---|
| 1 TR | Saturated Na Cl | 2½ mins. | — | 0 | 8 volts | 55 |
| 2 TR | Na Cl | 2½ mins. | — | 1/16" | do. | 34 |
| 3 TR | Na Cl | 10 secs. | — | 1/16" | do. | 45 |
| 4 TR | Na Cl | 10 secs. | — | ⅜" | do. | 46 |
| 5 TR | Na Cl | 5 secs. | — | 0 | do. | 36 |
| 6 TR | Na Cl | 5 secs. | — | 1/16" | do. | 40 |
| 7 TR | Na Cl | 5 secs. | — | ¼" | do. | 33 |
| 8 TR | Na Cl | 5 secs. | — | ⅜" | do. | 40 |
| 9 TR | Na Cl | 5 secs. | — | ½" | do. | 21 |
| 10 TR | Na Cl | — | 12"/sec. | ⅜" | do. | 10 |
| 11 RR | Na Cl | — | 12"/sec. | ⅜" | do. | 10 |
| 12 RR | Na Cl | — | 1/5"/sec. | ⅜" | do. | 20 |
| 13 RR | Na Cl | — | 3"/sec. | ⅜" | do. | 20 |
| 14 RR | Na Cl | — | 12"/sec. | | 4 volts | 11 |
| 15 RR | Saturated Na Cl | | 12"/sec. | | 3 volts | 12 |
| 16 RR | Potassium Bromide | | 1/5"/sec. | ⅜" | do. | 14 |
| 17 RR | Potassium dichromate | | 1/5"/sec. | ⅜" | do. | 12 |
| Lacsol 15 seconds scrub | | | | | | 8 |
| Unigrip 300 15 seconds scrub | | | | | | 13 |

After passing the anode, the sole and heel unit was removed from the electrolyte, washed with water and dried. After drying, a solvent-type adhesive solution was applied comprising a thermoplastic polyesterurethane dissolved in a mixed solvent comprising methyl ethyl ketone and toluene. Similar adhesive was applied to a lasted shoe bottom and after drying of the adhesive, the adhesive layers were heat activated and the sole and shoe bottom were pressed together with the adhesive between them. The resulting bond had a peel pull strength of more than 30 pounds per inch of width.

Example 2

A series of strips of thermoplastic rubber (TR) and resin rubber (RR) of dimension 2 × 1 inch were passed through the apparatus under the conditions set forth in the following Table I. The electrolytically pretreated strips were washed and dried and a coating of the above polyurethane based adhesive was applied. The same adhesive was applied to 2 × 1 inch strips of upper leather and, after evaporation of solvent, the layers of adhesive were heat activated and the strips pressed together to provide sample bonds of thermoplastic rubber or resin rubber to leather.

After storing for one day, the sample bonds were subjected to peel pull testing at a rate of 3 inches per minute to determine the peel bond strengths. The results are shown in Table I.

As shown in Table I, some of the samples were prepared using a graphite plate anode and other samples were prepared using a graphite plate anode and other samples were prepared using a ¼ inch diameter graphite rod anode over which the sample was moved at a speed indicated under the term, "speed of traverse."

For comparison, sample bonds were made using the same polyurethane based adhesive composition to bond 2 × 1 inch strips of roughed upper leather and 2 × 1 inch strips of resin rubber soling prepared by scrubbing with sole pretreating chemicals commercially

Example 3

In this Example, tests, of which the average of 10 replications is reported in the following Table II, were carried out using 3 × 1 inch strips of thermoplastic rubber and using the illustrative apparatus modified by use of an anode made up of six ¼ inch diameter graphite rods with centre-to-centre spacing, amperage and voltage as shown in Table II. The carbon rods had previously been impregnated by prolonged immersion in boiled linseed oil. A stainless steel cathode was used and the electrolyte was a saturated aqueous solution of sodium chloride. The treated surfaces were coated with the polyurethane adhesive, dried, heat activated and assembled with similarly treated strips. Peel bond strength (separation 3 inches/minute) obtained in the series of tests given in Table II.

TABLE II

| Spacing between centres | Amperage | Voltage | Peel bond strength |
|---|---|---|---|
| ¾" | 15 amps | 5 volts | 10–22 |
| ¾" | 25 amps | 7 volts | 22–28 |
| ½" | 15 amps | 5 volts | 23–30 |
| ½" | 25 amps | 7 volts | 25–43 |

Example 4

Tests similar to those set forth in Example 3 were carried out using the illustrative apparatus with an aqueous solution of 1,000 gm zinc chloride per litre of water as the electrolyte, a zinc cathode and six ¼ inch diameter graphite rods as used in Example 3 as an anode. In this Example the speed of traverse and the spacing of the surface of the strip to be treated from the anode were varied as indicated in Table III. After application of adhesive, heat activation and assembly, the peel bond strengths reported as an average of 10 replications of each, are given in Table III. It will be observed that the slower the speed of traverse or otherwise stated the longer the time of treatment, the greater the peel bond strength. However, particularly with the 1/16 inch spacing, it was considered that the improvement in bond achieved by the slower traverse would not be necessary for a satisfactorily strong bond.

| Spacing between centres | Speed of traverse of sample | Spacing of sample from anode | Amperage (amps) | Voltage (volts) | Peel bond strength |
|---|---|---|---|---|---|
| 7/16" | 9"/sec. | ¾" | 25 | 7 | 7–12 |
| 7/16" | 9"/sec. | 1/16" | 25 | 7 | 21–47 |
| 7/16" | 6"/sec. | ¾" | 25 | 7 | 14–28 |
| 7/16" | 6"/sec. | 1/16" | 25 | 7 | 30–47 |

EXAMPLE 5

In this Example, sample bonds were made up using 3 × 1 inch strips of thermoplasstic rubber and 3 × 1 inch strips of roughed upper leather. The strips of thermoplastic rubber were prepared for bonding by passing them through the illustrative apparatus shown in the drawings but modified by use of an anode made up of two graphite rods each 26 cm long and one-fourth inch in diameter mounted parallel to each other with their centres spaced ¾ inch apart. The cathode used comprises two 26 cm long, ¼ inch diameter carbon rods also mounted parallel to each other and parallel to the anode rods; the cathode rods were mounted with their centres ¾ inch apart and with the plane including their centre lines spaced five-eighths inch from the plane including the centre lines of the anode rods. The anode and cathode rods were of the same composition as the anode rods used in Example 3. The electrolyte used was an aqueous zinc chloride solution made up by dissolving 1,000 grammes zinc chloride per litre of water, with 10% further addition of concentrated hydrochloric acid. A direct current of 20 amps was passed at 8 volts across the electrodes; it was observed that 0.4 ml of chlorine gas was evolved per minute per cm length of the two anode rods, i.e. of the anode array. The thermoplastic rubber strips were moved over the anode at a speed of 2 inches per second, spaced one-sixteenth inch above the anode. The strips were then washed and dried and then the polyurethane based adhesive of Example 1 brushed on to the chlorinated surface. The same adhesive was applied to the strips of roughed upper leather; the adhesive layers were allowed to dry, then heat activated and the strips pressed together in pairs to form leather/thermoplastic rubber sample bonds. After storage for 1 day, the samples were peeled apart at 3 inches per minute; a force of 30 lbs per inch width was found necessary to separate the samples, and the failure induced was predominantly in the thermoplastic rubber.

Having described the invention, what I claim as new and desire to secure by Letters Patent of the United States is:

1. The method of surface pretreatment of bodies of non-conductive synthetic elastomer material to improve the ability of that surface to be coated or adhesively bonded comprising establishing an electrical potential across an anode and a cathode in a body of aqueous electrolyte to generate at said anode, products of electrolysis reactive with said elastomer to form reaction products more readily wet and bonded by coatings and adhesive compositions, said anode being substantially inert to products of electrolysis generated at said anode, disposing the surface to be treated in said body of electrolyte closely adjacent to said anode for engagement and reaction with said products of electrolysis as they are formed and maintaining said surface adjacent said anode for a period for reaction of the elastomer at said surface with products of electrolysis generated at said anode to form on said body a surface of reacted elastomer integral with the elastomer of said body and readily wetted and strongly adhered to by coatings and adhesives.

2. A method according to claim 1 in which the aqueous electrolyte includes a member of the group consisting of sodium chloride, zinc chloride, nickel chloride, stannous chloride, cobalt chloride, magnesium chloride, ammonium chloride, calcium chloride or barium chloride.

3. A method according to claim 1 wherein the anode comprises graphite rods located adjacent and parallel to each other and the cathode is of carbon or stainless steel.

4. A method according to claim 1 in which a sole attaching surface of a tread member of synthetic elastomeric material is passed through the body of aqueous electrolyte closely ajacent the anode at a rate providing said period of reaction with products of electrolysis, the tread member is removed from the body of aqueous electrolyte, washed and dried.

5. A shoe making process in which a surface to be adhesively bonded of a tread member of synthetic elastomeric material is disposed adjacent an anode in a body of aqueous inorganic halide electrolyte, an electrical potential is established between said anode and a cathode in said body of electrolyte to generate at said anode products of electrolysis including a halogen reactive with said elastomer to form reaction products more readily wet and bonded by tread member attaching adhesive compositions, said anode being substantially inert to said products of electrolysis, said surface is maintained closely adjacent to said anode for a period for reaction of the elastomer at said surface with said products of electrolysis as they are generated at said anode, the tread member is removed from said body of electrolyte, unwanted residue from the electrolytic treatment is removed, and an adhesive composition is applied to the tread member.

6. A process according to claim 5 wherein the adhesive composition on the tread member is activated, and the tread member is pressed against a prepared shoe bottom in order to adhesively bond the tread member to the shoe bottom.

7. A shoe making process according to claim 6 in which the aqueous electrolyte includes a member of the group consisting of sodium chloride, zinc chloride, nickel chloride, stannous chloride, cobalt chloride, magnesium chloride, ammonium chloride, calcium chloride and barium chloride.

8. A shoe making process as defined in claim 9 in which the anode comprises graphite rods located adjacent and parallel to each other and the cathode is of carbon or stainless steel, and in which the tread member is passed through the body of aqueous electrolyte adjacent the anode at a rate providing said period for reaction with products of electrolysis.

* * * * *